United States Patent
Schmidbauer

(10) Patent No.: US 8,613,783 B2
(45) Date of Patent: Dec. 24, 2013

(54) PROCESS AND PLANT FOR REFINING RAW MATERIALS CONTAINING ORGANIC CONSTITUENTS

(75) Inventor: Erwin Schmidbauer, Kastl (DE)

(73) Assignee: Outotec Oyj, Espoo (FI)

( * ) Notice: Subject to any disclaimer, the term of this patent is extended or adjusted under 35 U.S.C. 154(b) by 236 days.

(21) Appl. No.: 12/867,398

(22) PCT Filed: Feb. 4, 2009

(86) PCT No.: PCT/EP2009/000730
§ 371 (c)(1),
(2), (4) Date: Aug. 12, 2010

(87) PCT Pub. No.: WO2009/100841
PCT Pub. Date: Aug. 20, 2009

(65) Prior Publication Data
US 2010/0319253 A1 Dec. 23, 2010

(30) Foreign Application Priority Data

Feb. 13, 2008 (DE) .......................... 10 2008 008 942

(51) Int. Cl.
*C01B 3/24* (2006.01)

(52) U.S. Cl.
USPC ........................................ 48/127.1; 48/197 R

(58) Field of Classification Search
None
See application file for complete search history.

(56) References Cited

U.S. PATENT DOCUMENTS

| | | |
|---|---|---|
| 3,093,571 A | 6/1963 | Fish et al. |
| 4,157,245 A | 6/1979 | Mitchell et al. |
| 4,507,195 A | 3/1985 | Spars et al. |
| 7,135,151 B1 | 11/2006 | Palmas |

(Continued)

FOREIGN PATENT DOCUMENTS

| | | |
|---|---|---|
| EP | 1015527 B1 | 10/2001 |
| JP | 2001241611 A | 9/2001 |

(Continued)

OTHER PUBLICATIONS

Honda et al., Fluidized Bed Incinerator Operation Involves Separating Bed Material from Exhaust Gas, Separating Bed Material and Ash, and Returning Bed Material to Furnace and Ash to Solid and Gas Splitter Side, WPI / Thomson, Sep. 7, 2001, vol. 2001, Nr:73, XP002560560.

(Continued)

*Primary Examiner* — Imran Akram
(74) *Attorney, Agent, or Firm* — Leydig, Voit & Mayer, Ltd.

(57) ABSTRACT

A process for refining raw materials containing oil and/or bitumen includes supplying water and the raw materials to an expulsion stage and/or an expulsion stage and a downstream gasification stage to obtain solids containing non-evaporated fractions of heavy hydrocarbons and to expel hydrocarbonaceous vapor. The expelled hydrocarbonaceous vapor is supplied to a processing stage and is further processed to expel hydrocarbonaceous vapor to obtain processing stage products which are separated and withdrawn. The solids from the expulsion stage and/or the expulsion stage and the downstream gasification stage are introduced into a combustion stage. The non-evaporated fractions of heavy hydrocarbons are burned in the combustion stage to obtain hot solids which are recirculated from the combustion stage into the expulsion stage and/or the downstream gasification stage. An oxidizing atmosphere of the combustion stage is separated from an atmosphere of the expulsion stage and/or the downstream gasification stage using a blocking device.

22 Claims, 2 Drawing Sheets

(56) References Cited

U.S. PATENT DOCUMENTS

| | | |
|---|---|---|
| 2004/0182003 A1* | 9/2004 | Bayle et al. .................. 48/210 |
| 2005/0118076 A1 | 6/2005 | Lomas |
| 2006/0231459 A1 | 10/2006 | Swan et al. |
| 2009/0118559 A1 | 5/2009 | Stamires et al. |
| 2009/0188165 A1* | 7/2009 | Ariyapadi et al. ............ 48/210 |
| 2010/0187161 A1 | 7/2010 | Anastasijevic et al. |

FOREIGN PATENT DOCUMENTS

| | | |
|---|---|---|
| WO | WO 2006131506 A1 | 12/2006 |
| WO | WO 2008113553 A1 | 9/2008 |
| WO | WO 2009010157 A2 | 1/2009 |

OTHER PUBLICATIONS

International Search Report for PCT/EP2009/000730 mailed on Jan. 13, 2010.

Vego et al., Utilization of Spent Oil Shale in a Fluidized Bed Process, XP002560564, obtained online at http://www.anl.gov/PCS/acsfuel/preprint%20archive/Files/38_3_CHICAGO_08-93_0972.pdf.

* cited by examiner

PROCESS AND PLANT FOR REFINING RAW MATERIALS CONTAINING ORGANIC CONSTITUENTS

CROSS REFERENCE TO PRIOR APPLICATIONS

This application is a U.S National Phase application under 35 U.S.C. §371 of International Application No. PCT/EP2009/000730, filed on Feb. 4, 2009 and which claims benefit to German Patent Application No. 10 2008 008 942.7, filed on Feb. 13, 2008. The International Application was published in English on Aug. 20, 2009 as WO 2009/100841 A2 under PCT Article 21(2).

FIELD

The present invention relates to a process and to a plant for refining raw materials containing organic constituents, such as raw materials containing oil and/or bitumen, and in particular oil or tar sand and oil shale.

BACKGROUND

In view of an increasing shortage of petroleum deposits, the economic exploitation of raw materials containing organic constituents, such as oil or tar sands and oil shale, has become of greater interest. Oil or tar sands are mixtures of clay, sand, water and hydrocarbons. The latter can have different compositions and range from bitumen to normal crude oil. The hydrocarbon content in the sands is between about 1 and 18%. The economic efficiency of exploitation increases with the hydrocarbon content. Oil or tar sands can be recovered by surface mining. When extracting them from deeper soil layers, an initial processing of the oil or tar sand is already effected in situ. Steam is introduced into the deposit in order to liquefy the hydrocarbons. This kind of oil recovery therefore requires a great deal of water, which cannot be discharged entirely free from oil.

Oil shales are rocks which contain bitumen or low-volatility oils. The content of organic matter (kerogen) lies between about 10 and 30%. Oil shales are not shales in a petrographic sense, but layered, not schistous, sedimentary rocks. The recovery of hydrocarbons, such as oil from oil shale, is traditionally effected by mining and subsequent pyrolysis (carbonization at 500° C.). Subsurface recovery (in situ) is alternatively used by pressing a steam-air mixture into the rock previously loosened by blasting and ignition of a flame front, which expels the hydrocarbons such as oil.

The previous recovery of hydrocarbons, such as crude oil from oil or tar sands or oil shale is thus is relatively cost-intensive. With rising oil prices, the recovery of hydrocarbons, such as crude oil, from oil or tar sands and oil shale becomes increasingly interesting in economic terms. A problem in the present recovery of hydrocarbons, such as crude oil, from oil or tar sands and oil shales is the necessary high consumption of water and the emission of waste waters containing residual oil.

U.S. Pat. No. 4,507,195 describes a process for coking contaminated oil shale or tar sand oil on solids distilled in retorts. The hydrocarbonaceous solids are mixed with a hot heat transfer material, in order to raise the temperature of the solids to a temperature suitable for the pyrolysis of the hydrocarbons. The mixture is maintained in a pyrolysis zone until a sufficient amount of hydrocarbon vapors are released. In the pyrolysis zone, a stripping gas is passed through the mixture in order to lower the dew point of the resulting hydrocarbon vapors and entrain the fine particles. A mixture of contaminated hydrocarbon vapors, stripping gas and entrained fine particles is thereby obtained from the pyrolysis zone. From the contaminated hydrocarbon vapors, a heavy fraction is separated and thermally cracked in a fluidized bed consisting of fine particles, whereby the impurities together with coke are deposited on the fine particles in the fluidized bed. The product oil vapors are withdrawn from the coking container. As heat transfer material, recirculated pyrolyzed oil shale or tar sand is used, which was guided through a combustion zone, in order to burn carbon residues and provide the heat for the pyrolysis of the raw material. Since there is no pressure seal between the combustion zone and the pyrolysis furnace, the oxidizing atmosphere of the combustion zone can enter the pyrolysis furnace and impair the quality of the oil vapor. Thermal cracking in the coking container also consumes a great deal of energy and is therefore expensive.

EP 1 015 527 B1 describes a process for the thermal treatment of feedstock containing volatile, combustible constituents, wherein the feedstock is mixed with hot granular solids from a collecting bin in a pyrolysis reactor, in which relatively high temperatures exist. This should lead to cracking reactions in the gases and vapors in the reactor.

Besides the thermal cracking used in the above-mentioned processes, catalytic cracking processes are known. In Fluid Catalytic Cracking (FCC), the heavy distillate of a refinery is decomposed to gases, liquefied gases and gasolines, for example to long-chain n-alkanes and i-alkanes. Cracking is generally effected at temperatures between 450 and 550° C. and a reactor pressure of 1.4 bar by means of an alumosilicate-based zeolite catalyst. FCC crackers are described for instance in U.S. Pat. No. 7,135,151 B1, US 2005/0118076 A1 or US 2006/0231459 A1. An exemplary catalyst is disclosed in WO 2006/131506 A1. Further possibilities for the further treatment of hydrocarbon fractions include hydrotreatment and hydrocracking.

In a refining plant for raw materials containing organic constituents, such as oil-containing raw materials, the latter, for example, oil sand, can first be supplied to drying, then to preheating, then to an expulsion stage, and finally the residual solids can be supplied to a combustion stage. Drying is effected at, for example, about 80 to 120° C., and preheating at, for example, about 150 to 300° C. The expulsion stage operates at, for example, about 300 to 1000° C. In all three stages, hydrocarbonaceous vapors (oil vapors) are released, which are supplied to a processing stage (for example, by hydrocracking, coking and/or hydrotreating) and are further processed there. The residual solids of the expulsion stage can be introduced into a combustion stage and be burnt at, for example, about 1000 to 1200° C. The solid combustion products can be utilized, for instance, to heat up the expulsion stage. In most cases, the individual stages (drying, preheating, expulsion and combustion) can be operated as fluidized beds. As fluidizing gas, light hydrocarbons, inert gas (such as nitrogen), oxygen-containing gases, $CO_2$-containing gases or also waste gases of the combustion stage can be used. For the processing stage, hydrogen is also required beside the oil vapors (for example, for hydrocracking).

The qualities of oil-containing raw materials often are very different and fluctuating, so that in some cases only very little oil vapors are released in the expulsion stage or in a preceding stage, and that bitumen of the oil-containing raw materials tend to liquefy or coke instead of evaporating. The yield of desired oil vapors is reduced thereby and often more energy is produced in the combustion stage, which is not desired. The coking tendency of the oil increases with increasing temperature. In the case of higher-quality oil-containing raw materials, such as oil sands, which contain a great deal of oil and release their oil content simply, the relation between the generation of heat in the combustion stage and the generation of oil vapor in the expulsion stage can be accomplished by controlling the temperature in the expulsion stage and/or supplying supporting fuels in the combustion stage. In the case of oil-containing raw materials of low quality, such control is not possible, however, because of the risk of coking.

SUMMARY

An aspect of the present invention is to provide an improved process and a corresponding plant for raw materials containing organic constituents, such as raw materials containing oil and/or bitumen, in particular low-quality oil or tar sand and oil shale. An additional, alternative, aspect of the present invention is to provide a process and a plant which can meet the demand of hydrogen for the further processing of recovered hydrocarbonaceous vapors (oil vapors) or which can generate excess hydrogen for other purposes.

In an embodiment, the present invention provides a process for refining raw materials containing oil and/or bitumen which includes supplying water and the raw materials to at least one of an expulsion stage and a downstream gasification stage so as to obtain solids containing non-evaporated fractions of heavy hydrocarbons and to expel hydrocarbonaceous vapour at a temperature of from about 300 to about 1000° C. and a pressure of from about 0.001 to 1 bar. The expelled hydrocarbonaceous vapour is supplied to a processing stage and is further processed by at least one of cracking, coking and hydrotreating so as to obtain processing stage products. The processing stage products are separated and withdrawn. The solids containing non-evaporated fractions of heavy hydrocarbons from at least one of the expulsion stage and the downstream gasification stage are introduced into a combustion stage. The non-evaporated fractions of heavy hydrocarbons are burned in the combustion stage at a combustion temperature of from about 600 to about 1500° C. so as to obtain hot solids. The hot solids are recirculated from the combustion stage into at least one of the expulsion stage and the downstream gasification stage. An oxidizing atmosphere of the combustion stage is separated from an atmosphere of at least one of the expulsion stage and the downstream gasification stage using a blocking device.

BRIEF DESCRIPTION OF THE DRAWINGS

The present invention is described in greater detail below on the basis of embodiments and of the drawings in which.

DETAILED DESCRIPTION

Figure 1:
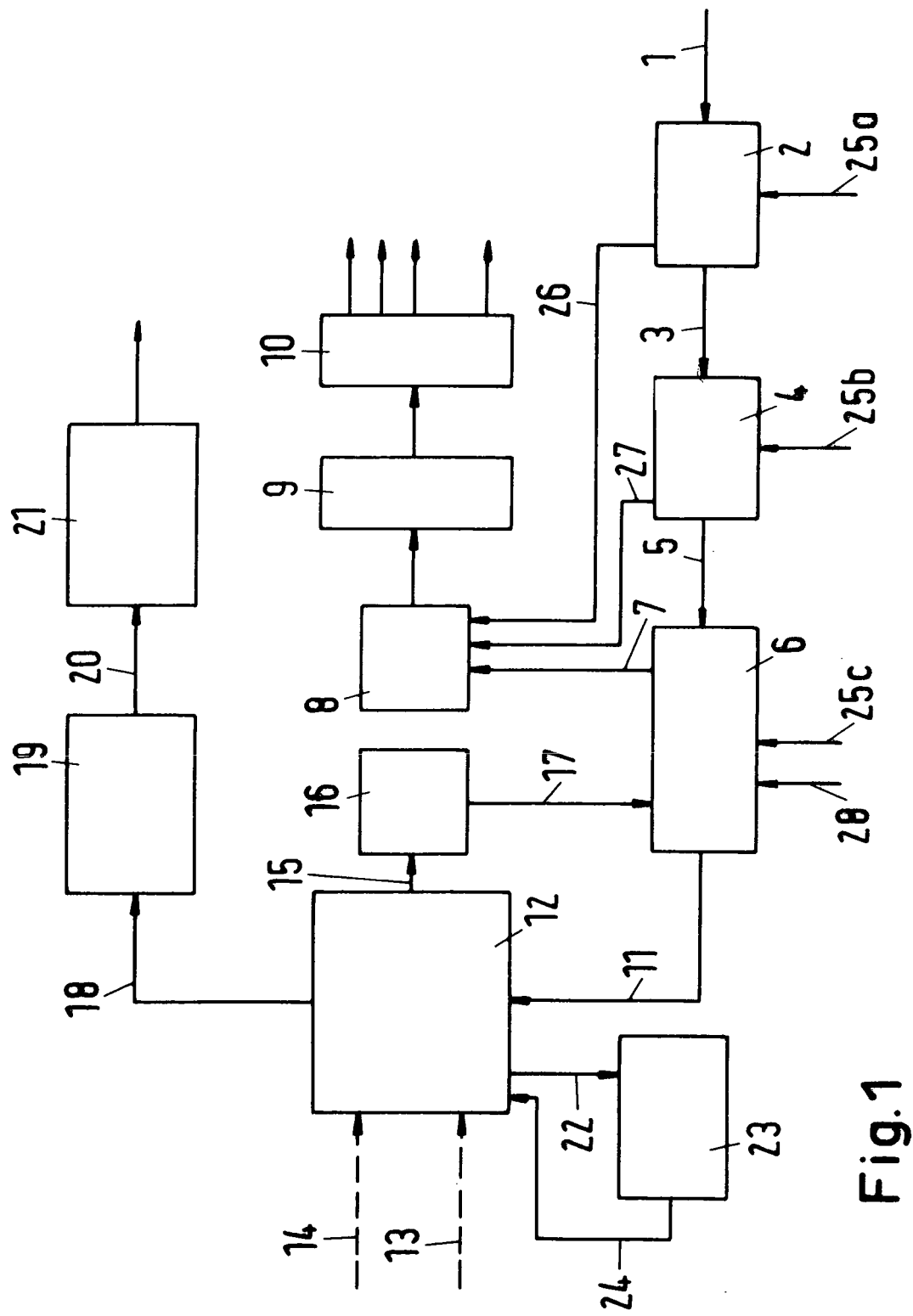
FIG. 1 schematically shows an exemplary plant for performing a process in accordance with the present invention.

At about 500 to 600° C., water already reacts with the coking products of the hydrocarbonaceous (oil-containing) solids, for example, in the reaction

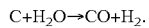

At the same time, the water can react with the low-volatility constituents of the oil-containing raw materials so that these are decomposed and more volatile components are obtained, which are expelled.

The resulting hydrogen can advantageously be used in the processing stage. By means of cracking, lighter hydrocarbons are obtained, which can be processed even further. With the addition of the amount of water and with the temperature in the expulsion stage, the amounts of hydrogen and hydrocarbons produced can be controlled and regulated. In the case that, for example, the generation of hydrogen should be increased or the separation of hydrogen should be simplified, it is expedient to operate a gasification stage parallel to or downstream of the expulsion stage.

If a gasification stage is present after the expulsion stage, the residual solids of the expulsion stage can be introduced either completely or in part. The residual solids of the gasification stage, just as the residual solids of the expulsion stage, can then be delivered to the combustion stage. With the amount of water added, in conjunction with the retention time and the temperature, the conversion of the solids can be controlled and the production of a desired amount of hydrogen can be determined. The water can, for example, be almost completely converted (at least for 70%, or at least 90%).

Alternatively, the gasification stage can be charged with oil-containing raw materials which do not originate from the expulsion stage, for example, from a preheating.

For the expulsion stage and/or the gasification stage, the water can wholly or partly replace the normally-used fluidizing gas.

By using a separate gasification stage, the gas composition, retention time and temperature can, for example, be adjusted and controlled independently of the expulsion stage. Optimum conditions for expelling the oil vapor in the expulsion stage and optimum conditions for gasification with water, possibly together with $CO_2$, in the gasification stage can thus be adjusted. In particular, the amount of water supplied can be increased in the separate gasification stage.

To provide the heat required for the gasification reaction, the water can be supplied to the expulsion stage and/or the gasification stage as steam or as superheated steam of, for example, about 600° C. This steam can at least partly be generated with the waste heat from the combustion or from other parts of the plant. The steam can be added with slightly elevated pressure, but also as low-pressure steam with a pressure of 2 to 10 bar.

To improve or control the yield in the reactor, electromagnetic waves (such as microwaves), ultrasound or the like can, for example, be used. It is likewise possible to use catalytically active substances in the expulsion stage, such as in a separate gasification stage, which can improve and control the expulsion or gasification of the organic constituents or control and change their composition.

The residual hydrocarbon content left in the solids can be burnt in the combustion stage configured as heat generator in order to provide the heat required in the expulsion stage and/or the gasification stage, by which means the solids withdrawn from the combustion stage can be transferred into the expulsion stage and/or the gasification stage. Between the combustion stage and the expulsion stage and/or the gasification stage, a seal can be provided in order to separate the oxidizing atmosphere of the combustion stage from the expulsion stage and/or the gasification stage and to avoid an oxidation, combustion or even an explosion of the gases generated in the expulsion stage and/or gasification stage.

The drying stage and/or the preheating stage and/or the expulsion stage and/or the gasification stage and/or the combustion stage can, for example, be operated as a fluidized bed.

Recycle gas from the expulsion or gasification stage, inert gas such as nitrogen, oxygen-containing gases such as air, $CO_2$-containing gases, CO-containing gases, oxygen, hydrogen and/or waste gases from the combustion stage and/or gases obtained from the drying stage and/or the preheating stage and/or the processing stage, which contain light hydrocarbons, or mixtures of said gases, can be supplied to the expulsion stage and/or the gasification stage as fluidizing and/or reaction gas. Water or steam can be added to these gases, which can in part contain light hydrocarbons beside steam. The hydrocarbonaceous waste gases, such as from the drying stage, which still contain water, thus can optimally be utilized, and a cooling in the combustion stage can be prevented. It is likewise possible to advantageously use, for example, waste water contaminated with hydrocarbons from other plants or parts of the plant in the expulsion and/or gasification stage. It may also be advantageous to use a reactor for the gasification stage in which the residual solids also are delivered into the combustion stage. A flash reactor, a stationary fluidized bed or an annular fluidized bed can therefore be used as well.

To improve energy balance, the preheated fluidizing and/or reaction gases can be supplied to the drying stage and/or the preheating stage and/or the expulsion stage and/or the gasification stage and/or the combustion stage, wherein heating the respective gases, such as the steam and the water used for generating the steam, can, for example, be effected by means of the waste heat obtained during heat recovery from the waste gas and/or from the calcination residue of the combustion stage.

In an embodiment of the present invention, the hydrocarbonaceous vapor can be expelled from the solids in the expulsion stage and/or in the gasification stage, for example, by distillation, and it can be expedient to operate the expulsion stage and/or the gasification stage under a reduced pressure in the range from, for example, about 0.001 to 1 bar. With a separate gasification stage, however, an excess pressure of, for example, 1 to 20 bar can also be adjusted.

To further increase the production of hydrogen, a CO shift reactor can be provided in accordance with an embodiment of the present invention after the expulsion stage and/or the gasification stage, in which the reaction $$CO+H_2O \rightarrow CO_2+H_2$$

takes place. In many cases, the reaction can be accelerated by catalysts.

With a great increase in temperature in the expulsion stage and/or the gasification stage to, for instance, from about 850 to 900° C., it is also possible that the $CO_2$ reacts as follows:

$$C+CO_2 \rightarrow 2CO.$$

With the CO shift reactor, the CO obtained likewise can be converted to $H_2$. Such increase in temperature, however, is not always desirable, as it might preclude a more favorable construction of the plant and the amounts recirculated from the combustion stage should be minimized. For the gasification stage, the temperature range can, for example, be from 450 to 800° C., such as 500 to 700° C. If the temperature is to be raised to above 800° C., for example, 900 to 1000° C., this can, for example, be effected only in the gasification stage.

The gases supplied to the CO shift reactor and/or the processing stage should be subjected to a gas cleaning, such as a dedusting and/or removal of disturbing gases, such as of $H_2S$.

The hydrogen obtained in the expulsion stage and/or the gasification stage and/or the CO shift reactor can be supplied to the processing stage, possibly together with other reaction gases, for cracking and/or a further utilization, such as liquefaction or synthesis, or be used as process gas in a metallurgical plant.

From the gases containing hydrogen and/or $CO_2$, the hydrogen can, for example, be separated, for instance by membrane processes, and/or $CO_2$ can be removed, for instance, by absorption on exchange media.

To provide the heat required for the gasification reaction, an indirect heating of the expulsion stage and/or of the gasification stage can be effected beside the recirculation of the residual solids from the combustion stage. Alternatively, a partial internal combustion of the solids can take place in the expulsion stage and/or the gasification stage. The CO obtained can likewise be processed to hydrogen in the CO shift reactor. Due to the possibility of an internal combustion, for example, in a separate gasification stage, the process also can be performed much more flexibly. If the heat required is provided by supplying additional residual solids from the combustion stage, a gas barrier between combustion stage and expulsion stage or gasification stage also is expedient here. Even in the case of a partial internal combustion, such gas barrier is expedient to provide for a selective and metered introduction of oxygen, mixtures with oxygen or air into the combustion stage.

In the processing stage, catalytic cracking can expediently be effected at a temperature of, for example, about 400 to 600° C. and a pressure of, for example, about 1 to 2 bar, for example by means of a zeolite catalyst. The separation of the products obtained in the processing stage can be effected in a distillation column.

The combustion in the combustion stage can advantageously be performed in an atmosphere rich in oxygen wherein a staged combustion can be effected. Additional fuel in the form of untreated hydrocarbonaceous solids, coal, coke, biomass or the like can then be supplied to the combustion stage. The heat generated in the combustion stage can be recovered from the waste gas and/or the calcination residue. Especially at low temperatures, heat quantities can thus partly be utilized, which can hardly be used expediently in some other way, for example, in the case of cooling water from the cooling of residues.

In an embodiment of the present invention, it is also possible to wholly or partly supply the waste gas from a substoichiometric stage of a staged combustion to the CO shift reactor. This can be effected after a possible cleaning or reprocessing of the waste gas. Furthermore, this waste gas from a substoichiometric stage or from the superstoichiometric combustion can be used as fluidizing, heating or reaction gas for drying, preheating, expulsion, gasification or even combustion.

The process of the present invention is not restricted to being used with low-quality hydrocarbonaceous raw materials. Reprocessing the products from the hydrocarbonaceous raw materials requires a large amount of hydrogen (such as for hydrocracking), however, the hydrogen supply represents a limiting factor. With the process of the present invention, it is possible to at least partly provide the hydrogen required for the further processing of the hydrocarbonaceous vapors (oil vapors).

The present invention also provides a plant for refining raw materials containing organic constituents, such as solids containing oil and/or bitumen, in particular oil or tar sand and oil shale, but also oil-containing fluidizable materials or wastes, with an expulsion stage and possibly with a gasification stage downstream of the expulsion stage, to which the hydrocarbonaceous raw materials are supplied, with a combustion stage to which solids and fuels coming from the expulsion stage and/or the gasification stage are supplied, with a return conduit, via which hot solids generated in the combustion stage are supplied to the expulsion stage and/or the gasification stage, with a blocking device for separating the gas atmospheres of the combustion stage and of the expulsion stage or the gasification stage, with a processing stage to which hydrocarbonaceous vapor expelled from the solids in the expulsion stage and/or the gasification stage and/or hydrocarbonaceous gases obtained from the CO shift reactor provided downstream of the same are supplied, and in which the heavy hydrocarbon components are decomposed by means of the hydrogen obtained in the expulsion stage and/or the gasification stage by adding water and/or in the CO shift reactor, and a separating means for separating the products obtained in the processing stage.

In accordance with an embodiment of the present invention, the plant can include a means for separating the hydrogen, which then can be used separately, from the hydrocarbonaceous gases originating from the expulsion stage and/or the gasification stage and/or the CO shift reactor.

The plant also can include a drying stage and/or a preheating stage before the expulsion stage and/or the gasification stage.

A gas cleaning can also be provided before the processing stage and the CO shift reactor, respectively.

With the present invention, it is furthermore proposed to provide a heat recovery system for the waste gas and/or the calcination residue downstream of the combustion stage.

Further aspects, features, advantages and possible applications of the present invention can be taken from the following description of embodiments and the drawings. All features described and/or illustrated form the subject-matter of the present invention per se or in any combination, also independent of their inclusion in individual claims or their back-reference.

A plant for refining raw materials containing organic constituents, which is schematically shown in FIG. 1, includes a drying stage 2, to which hydrocarbonaceous raw materials, such as oil or tar sand or oil shale, are supplied via a supply conduit 1. Via a conduit 3, the solids thus dried are delivered to a preheating stage 4 and from there, preheated, with a temperature of, for example, about 200° C. via a conduit 5 to an expulsion stage 6 suitable for distillation, in which the same are heated to, for example, 500 to 800° C., and the organic constituents thereby are expelled as hydrocarbonaceous vapors. In the illustrated case, the drying stage 2, the preheating stage 4 and the expulsion stage 6 constitute fluidized-bed reactors, to which the fluidizing and/or reaction gases are supplied via fluidizing conduits 25a to 25c. Via a conduit 28, water in the form of steam is furthermore supplied to the expulsion stage 6 as fluidizing and/or reaction gas.

The hydrocarbonaceous vapors (oil vapors) dried and preheated in the drying stage 2 and in the preheating stage 4 are supplied to a gas cleaning 8 via conduits 26, 27. Together with the hydrogen obtained by the reaction $C+H_2O \rightarrow CO+H_2$, the hydrocarbonaceous vapors (oil vapors) obtained in the expulsion stage 6 likewise are delivered via conduit 7 to the gas cleaning 8 and from there together with the remaining gases via a processing stage 9 including a cracker into a separating means 10, from which the individual product components are discharged to the outside. In the processing stage 9, the hydrogen originating from the expulsion stage 6 is used for cracking the heavy hydrocarbon components present.

Alternatively, conduit 26 can lead not into the gas cleaning 8, but into the expulsion stage 6.

The residual solids left in the expulsion stage 6 after expelling the hydrocarbon gases, which contain amounts of heavy hydrocarbons, are supplied via a conduit 11 to a combustion stage 12 configured, for example, as a fluidized-bed furnace, to which, for example, air, oxygen-containing or oxygen-enriched gas and part of the hydrocarbon gas originating from the expulsion stage 6 can also be supplied via conduits 13, 14 for starting, regulating or controlling the combustion stage 12.

From the combustion stage 12, a return conduit 15 leads to a non-illustrated blocking device 16 which serves to separate the atmospheres of the combustion stage 12 and the expulsion stage 6, and is connected with the expulsion stage 6 via a conduit 17.

The waste gas from the combustion stage 12 is supplied via a conduit 18 to a heat recovery 19 and then via a conduit 20 to a gas cleaning 21. The calcination residue of the combustion zone 12 also can be supplied to a heat recovery 23 via a conduit 22. The hot air obtained in the heat recoveries 19, 23 can be introduced as combustion air into the combustion stage 6 via a conduit 24. The heat recoveries 19, 23 can, however, also be used for preheating the fluidizing and/or reaction gases to be supplied to the various fluidized beds, such as the steam to be supplied to the expulsion stage 6 or the water provided for this purpose.

Figure 2:
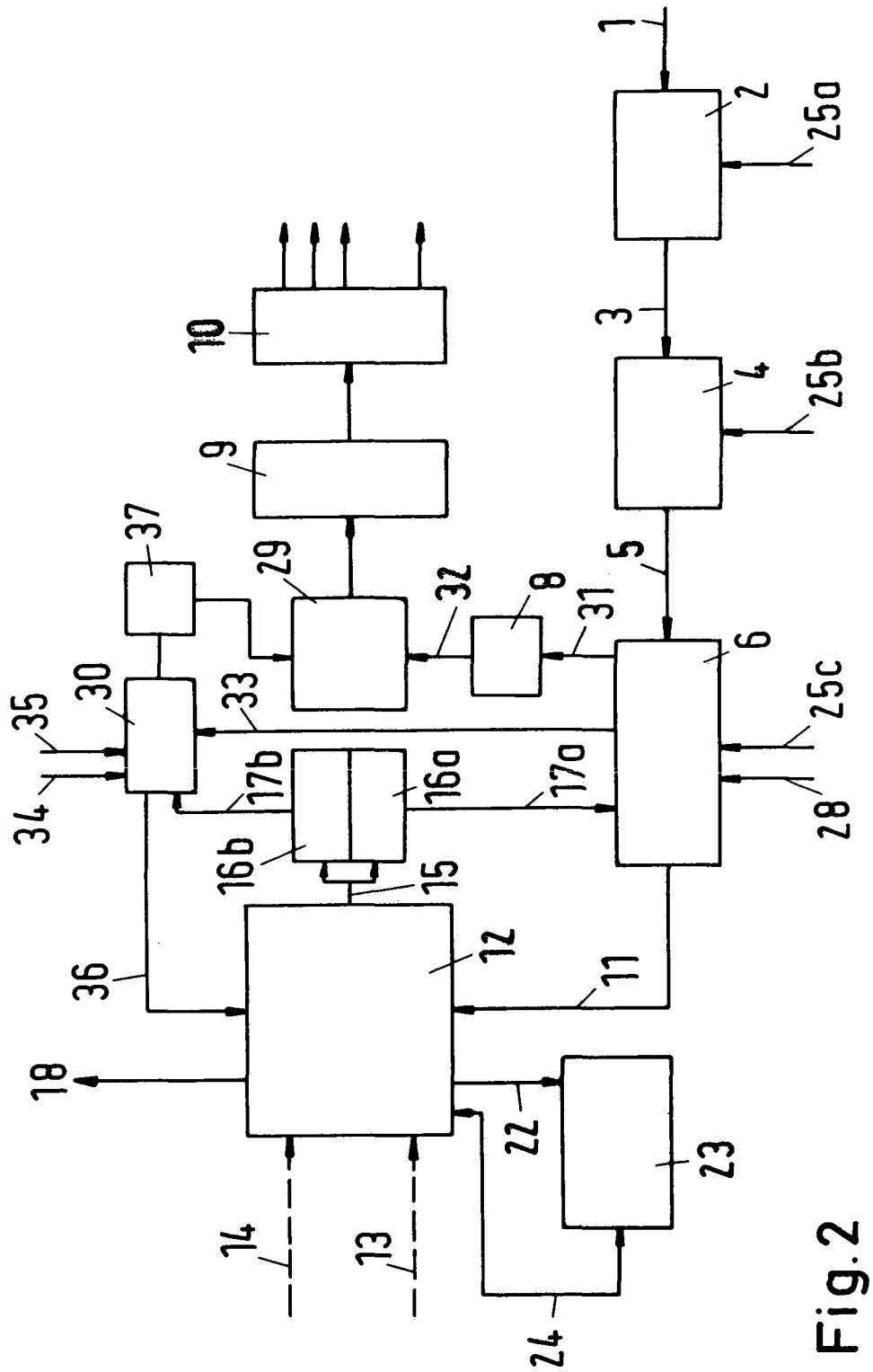
FIG. 2 schematically shows a possible alternative to the plant as shown in FIG. 1.

The plant shown in FIG. 2 is an alternative to the plant of FIG. 1, wherein identical parts of the plant are provided with the same reference numerals, in order to illustrate that they perform the same or corresponding functions as the parts of the plant shown in FIG. 1.

The plant as shown in FIG. 2 substantially differs in that the residual solids of the expulsion stage 6 are supplied via a conduit 33 to a gasification stage 30, which can be supplied with steam or fluidizing gas via conduits 34, 35. Via a conduit 36, the residual solids of the gasification stage 30 likewise are supplied to the combustion stage 12, which in this case is connected with the expulsion stage 6 and the gasification stage 30 via the return conduit 15 and the blocking devices 16a, 16b as well as the solid conduits 17a, 17b.

The plant as shown in FIG. 2 also differs from the one shown in FIG. 1 in that between the gas cleaning 8 and the processing stage 9, a CO shift reactor 29 is provided for the (additional) generation of hydrogen from the gases originating from the expulsion stage 6 and the gasification stage 30. Via a gas cleaning 37, which can be identical with the gas cleaning 8, the gasification stage 30 is connected with the CO shift reactor 29.

The present invention is not limited to embodiments described herein; reference should be had to the appended claims.

LIST OF REFERENCE NUMERALS 1 supply conduit for raw materials
2 drying stage
3 conduit for dried solids
4 preheating stage
5 conduit for preheated solids
6 expulsion stage
7 conduit for oil vapors and hydrogen
8 gas cleaning
9 processing stage (e.g., cracker)
10 separating means
11 conduit for residual solids
12 combustion stage (furnace)
13 conduit for combustion gas
14 conduit for fuel gas
15 return conduit for solids
16 blocking device
16a blocking device
16b blocking device
17 conduit for solids
17a conduit for solids 17b conduit for solids
18 conduit for waste gas
19 heat recovery for waste gas
20 conduit for waste gas
21 gas cleaning
22 conduit for calcination residue
23 heat recovery for calcination residue
24 conduit for heated air
25a-c fluidizing conduits
26 conduit for oil vapors
27 conduit for oil vapors
28 conduit for steam
29 CO shift reactor
30 gasification stage
31 conduit for oil vapors with CO and $H_2$
32 conduit for oil vapors with CO and $H_2$
33 conduit for solids
34 conduit for water
35 fluidizing conduit
36 conduit for residual solids
37 gas cleaning

The invention claimed is:

1. A process for refining raw materials containing oil and/or bitumen, the process comprising:
supplying water and the raw materials to at least one of an expulsion stage and a downstream gasification stage operated under a pressure from about 0.001 bar to 1 bar so as to obtain solids containing non-evaporated fractions of heavy hydrocarbons and to expel hydrocarbonaceous vapor at a temperature of from about 300 to about 1000° C.;
supplying the expelled hydrocarbonaceous vapor from the at least one of the expulsion stage and the downstream gasification stage to a CO shift reactor;
supplying the expelled hydrocarbonaceous vapor from the CO shift reactor to a processing stage and further processing the expelled hydrocarbonaceous vapor by at least one of cracking, coking and hydrotreating so as to obtain processing stage products;
separating and withdrawing the processing stage products;
introducing the solids containing non-evaporated fractions of heavy hydrocarbons from the at least one of the expulsion stage and the downstream gasification stage into a combustion stage;
burning the non-evaporated fractions of heavy hydrocarbons in the combustion stage at a combustion temperature of from about 600 to about 1500° C. so as to obtain hot solids; and
recirculating the hot solids from the combustion stage into at least one of the expulsion stage and the downstream gasification stage;
wherein an oxidizing atmosphere of the combustion stage is sealed from an atmosphere of the at least one of the expulsion stage and the downstream gasification stage using a blocking device.

2. The process as recited in claim 1, further comprising, before supplying the raw materials to the at least one of the expulsion stage and the downstream gasification stage, subjecting the raw materials to at least one of at least one preheating stage having a preheating temperature of from about 110 to about 300° C. and at least one drying stage having a drying temperature of from about 80 to about 120° C.

3. The process as recited in claim 1, wherein the water is supplied to at least one of the expulsion stage and the downstream gasification stage in the form of steam as a fluidizing gas.

4. The process as recited in claim 1, wherein the water is supplied to at least one of the expulsion stage and the downstream gasification stage as steam or superheated steam.

5. The process as recited in claim 1, wherein at least one of the expulsion stage, the downstream gasification stage and the combustion stage is operated as a fluidized bed.

6. The process as recited in claim 5, wherein at least one of an inert gas, an oxygen-containing gas, a $CO_2$-containing gas, a CO-containing gas, gases from an incomplete combustion of the combustion stage, oxygen, hydrogen, waste gases from the combustion stage, gases obtained from a drying stage, gases obtained from a preheating stage, gases obtained from the processing stage and gases containing light hydrocarbons, is supplied to at least one of the expulsion stage and the downstream gasification stage as at least one of a fluidizing gas and a reaction gas.

7. The process as recited in claim 6, further comprising preheating the at least one of the fluidizing gas and the reaction gas supplied to at least one of a drying stage, a preheating stage, the expulsion stage, the downstream gasification stage and the combustion stage.

8. The process as recited in claim 7, wherein the preheating of the at least one of the fluidizing gas and the reaction gas is performed by a waste heat obtained during a heat recovery of at least one of the waste gases and a calcination residue of the combustion stage.

9. The process as recited in claim 1, wherein the hydrocarbonaceous vapor is expelled from the solids in at least one of the expulsion stage and the downstream gasification stage by distillation.

10. The process as recited in claim 1, wherein the downstream gasification stage is configured to operate at a temperature of from about 850 to about 900° C.

11. The process as recited in claim 1, further comprising cleaning the hydrocarbonaceous vapor supplied to at least one of the CO shift reactor and the processing stage.

12. The process as recited in claim 11, wherein the cleaning includes at least one of a dedusting and a removal of $H_2S$.

13. The process as recited in claim 1, wherein hydrogen obtained in at least one of the expulsion stage, the downstream gasification stage and the CO shift reactor, is supplied to the processing stage for at least one of a cracking and a further utilization or is used as a process gas in a metallurgical plant.

14. The process as recited in claim 1, further comprising separating hydrogen and removing $CO_2$ from the hydrocarbonaceous vapor.

15. The process as recited in claim 1, further comprising indirectly heating at least one of the expulsion stage and the downstream gasification stage.

16. The process as recited in claim 1, wherein at least one of the expulsion stage and the downstream gasification stage is configured to at least partly internally combust the solids.

17. The process as recited in claim 1, wherein the further processing includes performing a catalytic cracking at a cracking temperature of about 400 to about 600° C. and a cracking pressure of about 1 to about 2 bar.

18. The process as recited in claim 1, wherein the separating of the processing stage products is performed in a distillation column.

19. The process as recited in claim 1, wherein the burning in the combustion stage is performed in an oxygen-rich atmosphere.

20. The process as recited in claim 1, wherein the combustion stage includes a staged burning.

21. The process as recited in claim 1, further comprising supplying an additional fuel to the combustion stage in the form of at least one of untreated hydrocarbonaceous solids and coal.

22. The process as recited in claim 1, wherein a heat generated in the combustion stage is recovered from at least one of a waste gas and a calcination residue.

* * * * *